3,119,746
DEVICES FOR SUPPORTING AT LEAST THE SOLID MODERATOR OF A NUCLEAR REACTOR HAVING VERTICAL CHANNELS
Georges Lemesle and Roland Roche, Paris, and Pierre Rougé, Gif-sur-Yvette, France, assignors to Commissariat a l'Energie Atomique, Paris, France, a state administration of France
Filed Nov. 5, 1958, Ser. No. 772,038
Claims priority, application France Nov. 9, 1957
1 Claim. (Cl. 176—50)

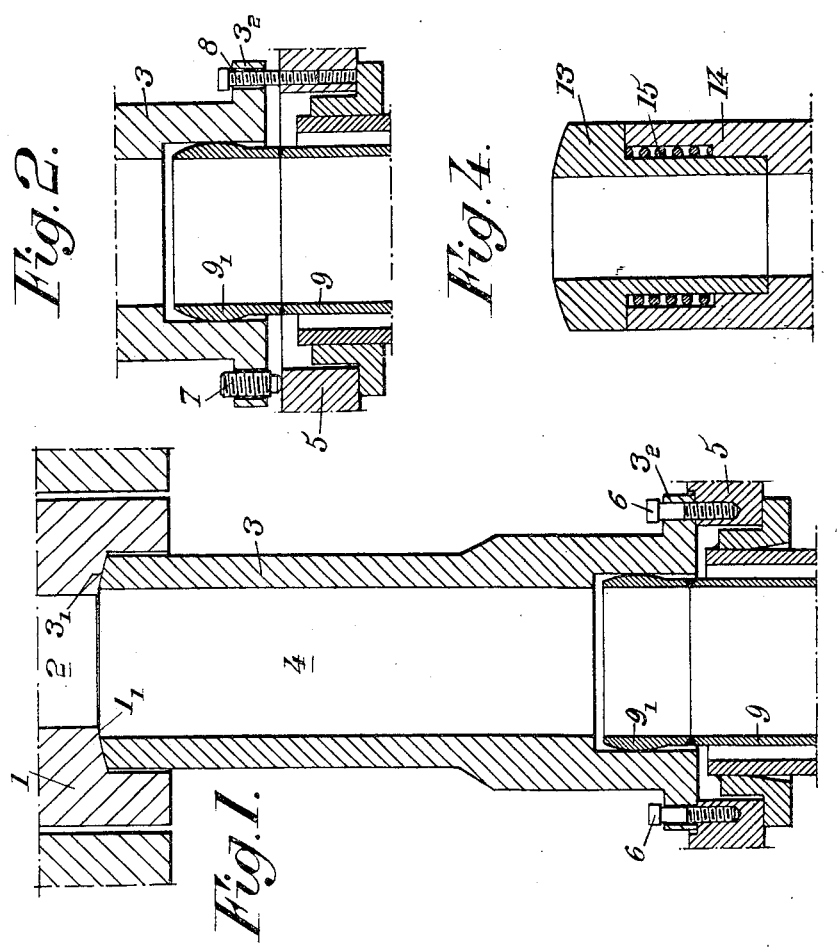

The present invention relates to devices for supporting the solid moderator of a nuclear reactor having vertical channels and furthermore at least a portion of its reflector.

It has chiefly for its object to provide a device of this kind which is such that the connection between the lower ends of the channels of the reactor and the upper ends of the corresponding conduits provided in the support base for the circulation of the coolant is obtained with a fluid tightness as perfect as possible.

It is known that the solid moderators of nuclear reactors are subjected, during the operation of said reactors, to multiple deformations of thermal or neutronic (Wigner effect) origin. The channels provided in these moderator units to house the fissionable material and for the circulation of the coolant tend also to be deformed and, in order to keep them in alinement, it is necessary to support the piling of the moderator elements by devices which are both flexible and strong.

Furthermore, in the case of such reactors having vertical channels cooled by a fluid under pressure, fluid tightness in the vicinity of the lower ends of the channels, that is to say of their connections with the corresponding conduits provided in the support base of the reactor, constitutes a very delicate problem.

As a rule, in order to solve this problem, the core of the reactor constituted by a piling of moderator elements is mounted on a plate made of a metal the coefficient of expansion of which is close to that of the moderator.

These plates must be capable of moving with respect to the support base of the reactor which is generally made of steel and has a different coefficient of expansion; this possibility of relative displacement is obtained for instance:

By merely placing separate plates on the support base,

By connecting the respective plates together and by fixing the point located in the vertical axis of the reactor, which permits relative radial displacements of the plates with friction on the support base, By interposing means such as ball bearings between the plates and the support base.

The use of such plates involves the following drawbacks:

They are made of a material which is rare and costly, for instance a ferro-nickel such as that sold under the commercial designation of "ADR" by the Imphy steel-works, if the moderator substance is graphite;

The upper and under surfaces of the plates must be perfectly flat in order to reduce to a minimum the risks of leakage between channels at the level of these surfaces;

Due to unavoidable deformations of the moderator bars, intervals are produced between the under faces of the lowermost bars and the upper face of the plates, and the coolant can communicate from one channel to the other through said intervals;

It is very difficult to keep the support base, and therefore the plates, exactly horizontal due to the weight of the moderator, to the pressure of the coolant and to the deformations of the whole of the plates and of the moderator every time the reactor is started or stopped; now any bending of the support base produces a fatigue of the moderator substance which is the more dangerous as this substance is more brittle, which is the case for graphite.

In order to obviate these drawbacks, according to the present invention, the moderator supporting device includes, for a given channel, a rigid member interposed, along the axis of said channel, between the moderator or reflector element which limits the lower end of this channel and the upper end, provided in the support base of the reactor, of the conduit for the circulation of the coolant, said member bearing upon said support base and being provided at its upper end with a spherical bearing surface adapted to fit and to cooperate with a spherical bearing provided at the lower end of said element so as to support it while permitting small relative angular displacements between this member and the element. Furthermore, preferably, means are provided to permit of slightly modifying the inclination of said member without impairing the fluidtightness of the connection it ensures between the channel and the coolant circulation circuit.

Preferred embodiments of the present invention will be hereinafter described with reference to the accompanying drawings, given merely by way of example and in which:

FIG. 1 is an axial vertical section of a moderator supporting device made according to the invention.

FIG. 2 similarly shows a portion of a modification of such a device.

FIG. 3 shows, also in axial vertical section, a modification of such a supporting device including two pairs of spherical bearing surfaces.

FIG. 4 is an axial vertical section of a portion of still another modification.

In the embodiment illustrated by FIG. 1, the lowest layer of the moderator-reflector body is constituted by upright bars, such as 1, provided with vertical channels 2. These bars are separated from one another by small intervals so as to make allowance for thermal and Wigner effect expansions.

According to the present invention, each of these bars is supported by a cylindrical metal member 3, provided with a channel or passage 4 disposed coaxially with the channel 2 of bar 1, but of a slightly greater diameter.

The upper end of member 3 is in the form of a spherical bearing $3_1$, preferably convex, adapted to fit against a corresponding spherical bearing $1_1$ provided at the lower end of the corresponding bar 1.

Member 3 is provided at its bottom end with a flange $3_2$ resting upon a corresponding seat provided on the support base 5 of the reactor, either directly, in which case member 3 is fixed to support base 5 by means of screws 6 (FIG. 1), the number of these screws being for instance four and said screws being distributed along the periphery of flange $3_2$; or through the intermediate of jacks 7 (FIG. 2) of adjustable height, the number of which is for instance three, the fixation being completed by an equal number of screws 8.

Thus, member 3 transmits the whole of the weight of the moderator column that is being considered to the support base 5 of the reactor.

Furthermore, the presence of the spherical bearings $1_1$ and $3_1$ enables said column to have small angular displacements with respect to member 3 and therefore to the support base 5.

In order to make it possible slightly to modify the inclination and/or the height of said member 3 itself with respect to the support base, without impairing fluidtightness of the connection for the coolant between channel 1 and conduit 9, said member 3 is advantageously provided with a cylindrical bore adapted to cooperate in tight fashion with a spherical ball-shaped expansion $9_1$ provided at the end of conduit 9.

In the modification illustrated by FIG. 3, the lower layer of the moderator and reflector body is constituted by adjoining blocks 10 resiliently applied horizontally against one another and the whole is supported by members 11 arranged to provide two swivel connections.

Every member 11 is a tubular member including at the upper end a spherical surface $11_1$ and at the lower end a spherical surface $11_2$, these two spherical surfaces being adapted to coperate with corresponding spherical surfaces, namely $10_1$ provided at the lower part of block 10 and $12_1$ provided in a ring 12 bearing upon a shoulder $5_1$ of a metallic tube $5_2$ rigid with the support base 5.

If the deformations of the supported structure the bottom of which is shown at 10 are relatively great, member 11 is made of great length so as to limit the amplitude of the angular displacements on the spherical bearings $11_1$—$10_1$ and $11_2$—$12_1$. Member 11 may be given this dimension without increasing the distance between the support base and the pile of moderator and reflector material by disposing shoulders $5_1$ in the vicinity of the lower wall $5_3$ of the support base 5.

Instead of being formed in the element (such as bar 1 or block 10) of the supported column of moderator, the spherical bearing which is to cooperate with the upper bearing of the tubular supported member may be made in a ring (not shown) of special steel (or any other suitable material) having a low thermal expansion coefficient, which is interposed between said member and said element, in order to reduce the importance of the differential expansions between the spherical parts in contact.

Of course, the inner diameters of the cylindrical conduits and channels and the shape of the connections between them must be such that the cans containing the fissionable material cannot wedge, during their displacements along said conduits and channels.

When there might be a lack of parallelism between the under face of the moderator structure and the upper wall of the support base, or local deformations of at least one of the elements piled upon one another in the vertical direction, a minimum contact pressure is preferably ensured in a permanent manner at the level of the spherical bearings so as to avoid leaks of coolant at this place.

For instance, the tubular supporting member is made of two cylindrical portions 13 and 14 slidable with respect to each other, as shown by FIG. 4, these two portions being constantly urged away from each other by the action of a spring 15 interposed between them. In case of variation of the distance between the bottom of the moderator body and the support base of the reactor, this spring keeps these two portions 13 and 14 against their spherical bearings in a fluidtight manner.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claim.

What we claim is:

In a nuclear reactor, the combination of a vertical core section including a moderator element in the form of a substantially vertical column, said vertical core section being provided with a vertical channel, a support base, a coolant circulation conduit extending through said base and having its upper opening located opposite said channel, a rigid tubular member interposed between the bottom of said core section and said support to transmit the load of said core section to said support base and serving also to connect said channel with said conduit in fluidtight fashion, the bottom of said core section being provided with a spherical bearing surface surrounding the bottom end of said channel and the upper end of said tubular member having a spherical surface adapted to fit with said first mentioned spherical surface in swivelling fashion, the lower end of said tubular member formnig a cylindrical bore and the upper end of said coolant conduit forming a ball-shaped expansion adapted to fit in swivelling fashion in said bore thus permitting small variations of inclination of said tubular member without impairing fluidtightness of the connection between said last mentioned ends, an outward flange at the lower end of said tubular member, three adjustable abutment means between said flange and said support base, respectively located at three different points of the periphery of said flange, whereby the inclination of said tubular member with respect to said support base can be adjusted at will, and means for fixing said flange to said support base in the position determined by said abutment means.

References Cited in the file of this patent

UNITED STATES PATENTS

| | | |
|---|---|---|
| 2,863,815 | Moore et al. | Dec. 9, 1958 |
| 2,877,170 | Greenhalgh et al. | Mar. 10, 1959 |
| 2,998,370 | Gaunt | Aug. 29, 1961 |

FOREIGN PATENTS

| | | |
|---|---|---|
| 785,928 | Great Britain | Nov. 6, 1957 |